(No Model.)

E. J. HESS.

VEHICLE SPRING.

No. 373,831. Patented Nov. 29, 1887.

2 Sheets—Sheet 1.

Attest
E. W. Harmon
O. M. Hill

Inventor
Elmer J. Hess,
per Wm. Hubbell Fisher
Attorney.

(No Model.)

E. J. HESS.
VEHICLE SPRING.

2 Sheets—Sheet 2.

No. 373,831.

Patented Nov. 29, 1887.

Attest
E. M. Harmon
O. M. Hill

Inventor
Elmer J. Hess,
her Wm. Hubbell Fisher,
Attorney.

UNITED STATES PATENT OFFICE.

ELMER J. HESS, OF CINCINNATI, OHIO.

VEHICLE-SPRING.

SPECIFICATION forming part of Letters Patent No. 373,831, dated November 29, 1887.

Application filed June 4, 1887. Serial No. 240,233. (No model.)

*To all whom it may concern:*

Be it known that I, ELMER J. HESS, a resident of Cincinnati, Hamilton county, Ohio, have invented certain new and useful Improvements in Vehicle-Springs, of which the following is a specification.

The several features of my invention and the advantages arising from their use, conjointly or otherwise, will be apparent from the following description.

Figure 1:
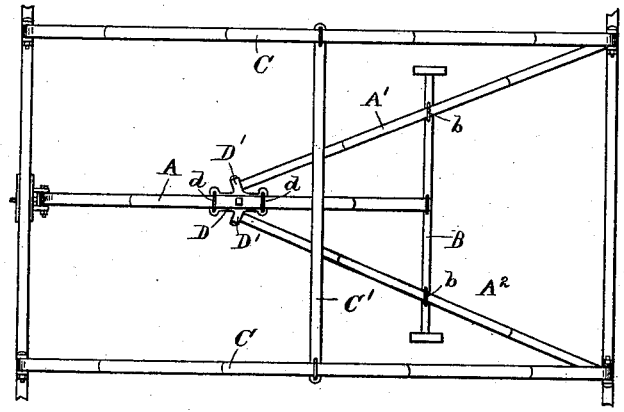
Figure 2:
Figure 3:
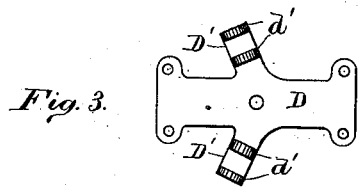
Figure 4:
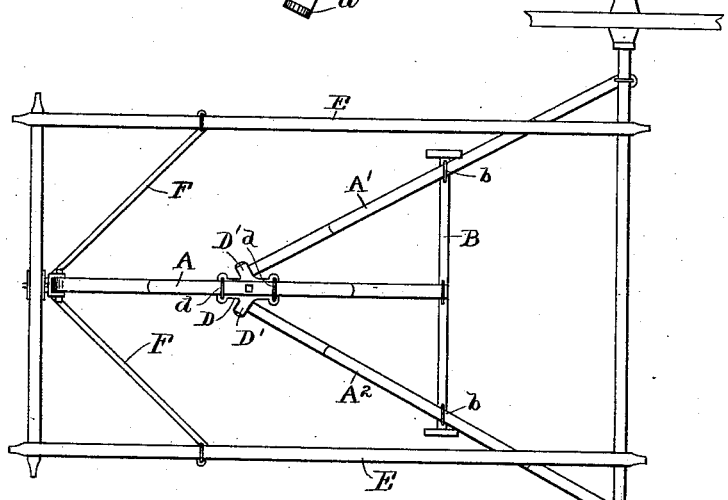
Figure 5:
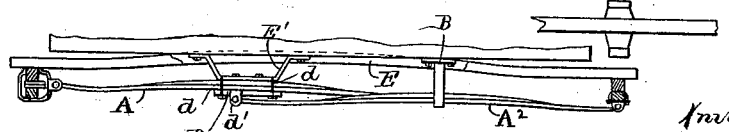
Figure 6:
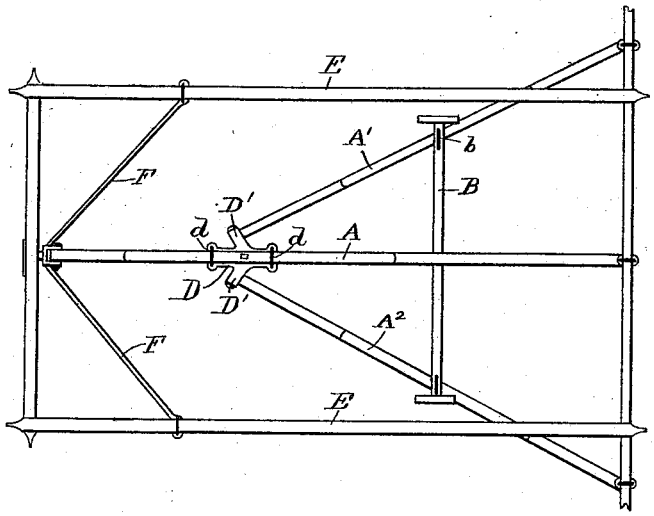
Figure 7:
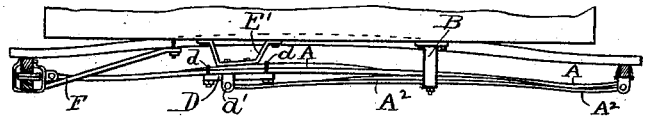

In the accompanying drawings, forming part of this specification, Figure 1 is a top view of a vehicle running-gear having side springs and provided with my improved spring. Fig. 2 is a side elevation of my improved spring, showing its connection to the running-gear. Fig. 3 is a bottom view of the coupling-plate employed in fastening the side elements of the spring to the central element. Fig. 4 is a top view of a side-bar running-gear provided with my spring. Fig. 5 is a side elevation of the device shown in Fig. 4. Fig. 6 is a top view of a running-gear, showing the middle spring extended to the rear axle. Fig. 7 is a side elevation of the gear shown in Fig. 6.

The central element, A, is a sectional spring, preferably comparatively flat and composed of one or more spring-leaves. It is attached in front to the axle by means of a swivel-shackle, or to the fifth-wheel frame in such manner as not to interfere with the turning of the axle. It extends backward in the center of the running-gear about two-thirds the length of the gear, where it is attached by any desired means to the brace B. The brace B is attached to the sides of the body of the vehicle, and, dropping down, extends transversely under the body nearly its entire width.

The coupling-plate D is attached to the under side of the spring A by means of clips $d\ d$. There is also preferably provided a central bolt or rivet perforating both the spring and plate. The arms D' D' project from the sides of the plate, and each is provided with downwardly-projecting ears $d'$.

The side sections, A' A², are preferably springs composed of one or more leaves. Each is attached anteriorly to a pin passing through the ears $d'\ d'$ of the plate D, and, passing backward and outward, is attached to the rear axle, preferably on its under side. The springs A' A² pass over the brace B, and each is attached thereto by a clip, $b$.

In the arrangement shown in Fig. 1 the head-block and rear axle are connected by the side springs, C, which latter are preferably joined together by the cross-brace C'.

When the frame is rendered rigid by the use of the side bars, E, instead of the springs C, suitable means must be employed for permitting longitudinal extension of the springs A A' A². This may be accomplished by swinging shackles or by bowing the springs themselves, as is well known in the art.

When the rigid side bars are employed, I preferably, also, employ the diagonal braces F. (Shown in Fig. 4.) When the side bars are employed, the body of the vehicle is supported by a standard, E', projecting up from plate D, besides resting on the brace B.

The mode of operation of the device is as follows: Pressure on any one of the three springs is distributed through the connecting mechanism to the other two. Thus a weight coming upon one of the side springs, as A', bears upon the central spring, A, at its center and is partly borne thereby. The pressure on spring A' also depresses brace B, and the pressure received by spring A is also partially transmitted to brace B at its center. The pressure on brace B brings the spring A² into play, thus equalizing the entire weight.

In the modification shown in Figs. 6 and 7, the spring A is extended rearward and attached to the rear axle, as shown. In such case the spring A is preferably symmetrical, as shown. The connection between spring A and brace B is then preferably omitted.

The side pieces, C, may be springs or rigid.

What I claim as new, and desire to secure by Letters Patent, is—

1. The combination of spring A, attached posteriorly to brace B, and springs A' A², each attached anteriorly to spring A and centrally to brace B, substantially as and for the purposes specified.

2. The combination of spring A, attached posteriorly to brace B, and springs A' A², each attached anteriorly to spring A and centrally to brace B, and side springs, C, and head-block and axle, substantially as and for the purposes specified.

3. The combination of the spring A, attached to the front axle and to brace B, brace B, attached to the body of the vehicle, plate D, provided with arms D' and ears d', and springs A' A², attached to plate D, and rear axle, and brace B, substantially as set forth.

4. The combination of the head-block, rear axle, side springs, C C, spring A, attached to the front end portion of the gear and to brace B, brace B, attached to the body of the vehicle, plate D, provided with arms D' and ears d', and springs A' A², connected at D, and also attached to brace B and to rear axle, substantially as and for the purposes specified.

ELMER J. HESS.

Witnesses:
O. M. HILL,
E. M. HARMON.